United States Patent
Fennel et al.

(10) Patent No.: US 7,111,507 B2
(45) Date of Patent: Sep. 26, 2006

(54) METHOD FOR COMPENSATING TEMPERATURE IN A TIRE PRESSURE MONITORING SYSTEM

(75) Inventors: Helmut Fennel, Bad Soden (DE); Martin Griesser, Eschborn (DE); Andreas Köbe, Bensheim (DE); Frank Edling, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 86 days.

(21) Appl. No.: 10/505,385

(22) PCT Filed: Feb. 28, 2003

(86) PCT No.: PCT/EP03/02064

§ 371 (c)(1),
(2), (4) Date: Aug. 20, 2004

(87) PCT Pub. No.: WO03/074299

PCT Pub. Date: Sep. 12, 2003

(65) Prior Publication Data

US 2005/0162263 A1 Jul. 28, 2005

(30) Foreign Application Priority Data

Mar. 1, 2002 (DE) .................... 102 08 816

(51) Int. Cl.
*B06C 23/02* (2006.01)
(52) U.S. Cl. .............. 73/146.4; 73/708; 73/146; 374/45; 374/143
(58) Field of Classification Search ....... 73/146–146.8, 73/700–756; 374/45, 143

See application file for complete search history.

(56) References Cited

U.S. PATENT DOCUMENTS

| 4,909,074 | A |   | 3/1990 | Gerresheim et al. |
| 5,071,259 | A | * | 12/1991 | Metzger et al. ............. 374/143 |
| 5,587,698 | A | * | 12/1996 | Genna ...................... 340/442 |
| 5,780,733 | A |   | 7/1998 | Meunier |

FOREIGN PATENT DOCUMENTS

| DE | 38 42 723 A1 | 6/1990 |
| DE | 100 29 282 A1 | 12/2001 |
| WO | WO 01/25034 A1 | 4/2001 |

OTHER PUBLICATIONS

International Search Report for Application No. PCT/EP03/02064 dated Jun. 17, 2003.

* cited by examiner

*Primary Examiner*—Edward Lefkowitz
*Assistant Examiner*—Jermaine Jenkins
(74) *Attorney, Agent, or Firm*—RatnerPrestia

(57) ABSTRACT

The invention discloses a method for compensating temperature in a system for tire pressure monitoring which is especially implemented by detecting a tire pressure and/or by detecting a tire pressure loss. The method is especially characterized in that the temperature is compensated by determining the gas temperature in the tire by way of at least two items of temperature information and by taking the determined temperature as a basis for said tire inflation monitoring. One significant advantage of this method involves that externally active temperature changes, such as a heat-emitting brake disc causing the wheel rim of the tire and, hence, also a temperature sensor arranged thereat to be heated more intensely than the gas in the tire, do not lead to an indication error with respect to the tire pressure (or a spurious alarm).

11 Claims, 2 Drawing Sheets

METHOD FOR COMPENSATING TEMPERATURE IN A TIRE PRESSURE MONITORING SYSTEM

TECHNICAL FIELD

The invention relates to a method for compensating temperature in a system for tire pressure monitoring which is especially implemented by detecting a tire pressure and/or by detecting a tire pressure loss.

BACKGROUND OF THE INVENTION

Systems for tire pressure detection are known in the art where the tire pressure is determined on the basis of tire pressure measuring modules measuring the tire pressure and emitting a corresponding test value to a receiver installed in the vehicle (also referred to as TPMS, i.e. 'Tire Pressure Monitoring System'). A module of this type can e.g. be mounted close to the valve in the wheel rim or can be structurally united with the valve. A prior art system founding on pressure measurement uses in each wheel a co-rotating wheel module that is integrated into the valve and measures the tire pressure and the tire temperature by means of corresponding sensors. This data is transmitted in wireless manner to a receiver installed in the vehicle and processed in an electronic evaluating device. The received and processed test values are used either to indicate a pressure value or to produce alarm signals when the tire pressure falls below predetermined threshold values, i.e. when tire pressure loss is detected.

The employment of a system of direct measurement such as TPMS necessitates indicating a tire pressure value, which is independent of ambient conditions, in particular temperature. This is because it is generally felt to be unpleasant when a pressure value shown on the control panel undergoes excessive variations, although e.g. only the driving condition or the outside temperature has changed.

U.S. Pat. No. 4,909,074 discloses a method of detecting, evaluating and displaying a value of a tire pressure, wherein an information signal that represents a detected pressure is compared with a large number of specifically selectable, desired curves of values. These curves of values illustrate pressure ranges for respectively defined values of the ambient temperature and the inner tire temperatures (as well as the ambient pressure, as the case may be) with defined tolerance ranges respectively depending thereon. A corresponding signal is produced when it results from the comparison that the actual tire air pressure is outside the tolerance range. Further, the information signal can be compared with a desired tire pressure that is associated with a predetermined maximum speed. It is then possible to issue a maximum safe speed in dependence on the result of the comparison.

Thus, the ambient temperature is taken into account in this method when detecting, evaluating and displaying a tire pressure or its allowable value. However, this method, exactly as the TPMS method initially referred to, still suffers from the problem that the temperature, which is measured by a sensor e.g. in the valve in a per se known fashion, generally is the wheel rim temperature, yet not (necessarily) the actual temperature of the gas in the tire.

This is because the wheel rim temperature, above all with relatively quick temperature variations, does not correspond to the temperature of the gas in the tire. It may occur, for example, that the brake disc of the motor vehicle and, as a consequence thereof, also the wheel rim heats up relatively quickly, with the result that a temperature gradient develops between tire and wheel rim and the gas temperature is initially essentially lower than indicated by the sensor signal.

Further, it may occur that the ambient temperature changes suddenly and significantly (the motor vehicle is e.g. driven out of a garage). Due to different heat conductions and a differing specific heat of the materials and the related significantly quicker variation of the temperature of the wheel rim compared to the tires mounted, this change may also lead to the said undesirable temperature gradients or to faulty measurements of the gas temperature.

Further, methods for tire pressure loss detection are known in the art that operate without pressure sensors such as the system DDS (Deflation Detection System) of Continental Teves, Frankfurt am Main. A change of the rolling circumference of the tire that is caused by a pressure change is detected and evaluated in these systems. Like in the above-mentioned systems, it may be desirable in these or other systems to indicate a pressure value irrespective of the gas temperature in the tire, on the one hand. On the other hand, there is the problem that a sensor used to detect and compensate this temperature will not indicate the actual gas temperature in the tire due to external influences such as a hot brake disc, but indicates a higher temperature (maybe also a lower temperature under different influences) so that temperature compensation is effected wrongly.

BRIEF SUMMARY OF THE INVENTION

In view of the above, an object of the invention is to provide a method for temperature compensation in a system for tire pressure monitoring of the above-mentioned type, which allows determining in a relatively simple fashion a temperature-compensated gas pressure in a tire with a relatively high rate of accuracy even at outside temperature variations and maybe additionally indicating a value for the tire pressure that is suitably modified in terms of temperature.

This object is achieved by means of the described method for compensation temperature mentioned hereinabove which is characterized in that the temperature compensation is effected by determining the gas temperature in the tire by way of at least two items of temperature information and the determined gas temperature is made the basis for tire pressure monitoring.

One advantage of this solution involves that it also allows at least significantly reducing the risk of a spurious alarm due to an allegedly too high or too low tire pressure or a tire damage.

Another advantage of this solution involves that the temperature information can be determined also by way of a calculated temperature model, thereby obviating the need for temperature sensors.

The sub claims are related to favorable improvements of the method.

As is known, the measured pressure of a real gas according to the Boltzmann equation $$P*V = n*k*T, \qquad (1)$$

with P=pressure, V=volume, n=number of the particles, k=Boltzmann's constant k and T=temperature, also depends on the temperature at which the pressure was measured. Corresponding equations can be formed for real gases such as air.

'Gas' according to the conceptual definition of the invention among others refers to air.

Solved with respect to pressure, the following equation is achieved:

$$P=(n*k*T)/V. \quad (2)$$

Under the assumption that n and V are constant, the pressure P is proportional to the temperature T.

The temperature is determined directly by means of physically existing temperature sensors and/or by way of temperature quantities derived from other parameters prevailing in the motor vehicle. These parameters are preferably quantities describing the driving condition and being provided in a particularly preferred manner in an electronic brake control unit with ABS and/or ESP. The driving condition variables are then used to determine the tire condition, giving hints at the temperature of the tire. Driving condition variables are preferably determined in part or in whole from sensor data (e.g. wheel rotational speed, yaw rate, transverse acceleration, brake application, etc.).

The following temperature information determined by sensors can be evaluated individually, as is preferred, or in combination with each other according to the invention. It is also possible to determine two or more items of temperature information in that the same temperature information is taken into consideration repeatedly in time intervals or several times:

temperature probes of tire pressure sensors e.g. mounted on the wheel rim, outside temperature sensor(s)

temperature sensor(s) of an electronic control unit, in particular a brake control unit, and brake disc temperature sensor(s).

Temperature information to be determined in calculations can also be used apart from the above-mentioned physical temperature sensors. This temperature information can be derived from driving dynamics quantities, as described above, and will be referred to as 'virtual temperature' in the following.

In turn, the following virtual temperatures can be taken into account individually, as is preferred, or in combination with each other according to the invention:

virtual temperature of the brake disc and virtual temperature of the tire.

The gas temperature that is this way determined or assessed is preferably used in a method of the invention.

The following formula is made the basis for calculating the pressure, e.g. for a pressure indication (display) arranged in the control panel or for detecting that the pressure falls below a critical limit value:

$$\Delta P=\Delta P_{T0}+\Delta P_k, \quad (3)$$

$$\text{with } \Delta P_{T0}=n*k*((T_{meas}-T_0)/V \quad (4)$$

$$\text{and } \Delta P_k=n*k*\Delta T_k/V. \quad (5)$$

where $\Delta T_k$ is a correction temperature, which will be determined in the manner described hereinbelow and which is required to correct the current temperature $T_{meas}$ defined in particular by way of the tire pressure sensor.

A: Determination of the Constant Components of the Formula of Calculation

To be able to convert the determined pressure to a pressure to be displayed as mentioned hereinabove, initially, the constant C=n*k/V is preferably determined by interpolation of the curve $P_{meas}(T_{meas})$ according to the method of the invention.

In an especially preferred manner, interpolation is executed by measuring two or more pairs of pressure and temperature values $P_i$, $T_i$, which are approximated by a straight line $P_{meas}=C*T_{meas}$ in particular according to the method of linear regression. In an especially advantageous manner, the value of the constant C is permanently stored in a memory of an electronic control unit so that it is available also after the ignition's re-start. In particular, the accuracy of the interpolation is gradually enhanced by constantly adding new pairs of values $P_{meas,i}$, $T_{meas,i}$. This permits favorably enhancing the accuracy of the interpolation still further in the course of time.

B: Compensation of the Determined Tire Temperature

In a display of the tire pressure e.g. in the control panel, the determined gas temperature is used to make a conversion to a reference temperature $T_0$ (e.g. room temperature, 20° C.), and this converted value is displayed as the current tire pressure value related to the temperature $T_0$. It is of course alternatively possible to calculate a correction pressure $\Delta P_{T0}$.

C: Correction of the Temperature

When the temperature of the temperature sensor, which is used for pressure determination (e.g. temperature sensor of the TPMS wheel module), does not correspond to the gas temperature, said must be corrected.

C1: Correction of the Tire Pressure Temperature Test Value on the Basis of the Detection of a Dynamics in the Temperature Test Value Therefore, the time-related behavior of the temperature information of a sensor and/or one or more of the above-mentioned virtual temperatures is examined in a preferred manner. When a change of the so obtained temperature information is detected, the prospected end temperature is assessed preferably by examining the time variation of the course of the temperature. Said assessment can be performed in an especially favorable manner by interpolation by means of an exponential function. E.g. a prospective final temperature value $\Delta T_0$ can be calculated this way. If e.g. only two temperature values are known, it is already possible to determine an exponential function.

The correction to be made is then achieved according to:

$$\Delta T_k=\Delta T_0*\exp(-a*t). \quad (6)$$

Suitably, the correction value is reduced time-dependently according to this formula so that the measured pressure value approximates the indicated pressure value at an increasing rate.

C2: Correction of the Temperature Test Values by Using Additional Temperature Information The time response of the temperature information can be determined in particular by means of a tire pressure sensor, an outside temperature sensor, or a virtual sensor.

The measured temperature values can be used directly for determining the exponential function in a tire pressure sensor and an outside temperature sensor.

C2.1: Correction of the Tire Temperature Value by Means of the Brake Disc Temperature When the information of a brake disc temperature sensor is evaluated, information about the heating of the tire inflation is obtained, which heating is caused by the brake disc's radiation. Preferably, the quantity of heat transmitted from the brake disc onto the tires is assessed from the difference between the brake disc temperature and the tire temperature by means of a proportionality constant that is to be determined experimentally, for example. The so determined compensation temperature $T_k$ is assumed as the difference between old temperature and new temperature. Its time variation is defined by means of an exponential function to be determined, as illustrated in FIG. 2. A time-dependent variation of $T_k$ is obtained hereby. The correction temperature more and more approximates a constant value $\Delta T_{k0}$ in the time variation of the function. It is possible to experimentally determine the value of $\Delta T_{k0}$ and store it in the system.

C2.2 Correction of the Tire Temperature Value by Calculating the Temperature of the Tire From Driving-dynamics Variables (Virtual Temperature)

The virtual tire temperature is favorably calculated by using driving condition variables which are already provided in a control unit of an electronic brake system, such as wheel torque M, longitudinal acceleration $a_{long.}$, or lateral acceleration $a_{lat.}$. The current tire condition is determined from the driving condition in a particularly preferred manner. The following formula expresses said calculation:

$$T_{tire,i} = f(\text{driving dynamics variables}), \quad (7)$$

where f is a mathematical function and i specifies one of the tire positions in the vehicle.

The tire temperature is regarded in particular as the sum of individual temperature terms that take influence on the tire's temperature. These individual 'tire temperature components' are added up as a function of time as follows:

$$T_{tire,i} = \Sigma^{time} \Delta T_{tire} \quad (8)$$

Favorably, the calculation is executed separately for each tire i. An example for a formula of calculation is indicated hereinbelow:

$$\Delta T_{tire} = \alpha * M * \Delta t + \beta * a_{long.} * \Delta t + \gamma * a_{lat.} * \Delta t - \beta * (T_{tire} - T_{ambience}) * k_1 * \Delta t, \quad (9)$$

where
- $k_1$ is the coefficient of heat transmission between tires and ambience,
- $\Delta t$ is a time interval, e.g. the loop period of the electronic brake control unit,
- $T_{ambience}$ is the temperature measured at an outside temperature sensor, and
- $\alpha, \beta, \gamma, \delta$ are proportionality factors which can e.g. be determined experimentally and represent the respective influence of the physical quantity on the tire temperature.

The experimentally determinable variables can be considered as being independent of tires when the temperature or pressure correction that shall be performed according to the invention and suffers from a certain rate of inaccuracy shall be deemed sufficient. When a particularly high degree of consistency between the estimated tire air temperature and the actual tire air temperature is desired, it can be expedient and appropriate to vary the above proportionality constants in dependence on the type of tire.

Time-dependent Examinations

When the constant C and the correction temperature $\Delta T_k$ was determined according to the above method, the measured tire pressure value will be corrected.

The differential pressure $|\Delta P|$ is in each case increased by the component $|\Delta P_k|$ which might have been caused by an assumed temperature error (measured temperature in relation to tire air temperature).

The pressure difference $\Delta P_k$ amounts to:

$$|\Delta P_k| = C * |\Delta T_k| * \exp(-a*t) \quad (10)$$

This value is reduced exponentially with time t.

A corresponding (additional) correction term is achieved by taking into account the temperature measured at the outside temperature sensor as follows:

$\Delta P$ is additionally increased by the component $\Delta P_k$ that was assessed by way of the signal of the outside temperature sensor:

$$|\Delta P_k| = C * |\Delta T| \quad (11)$$

Herein $|\Delta T|$ is assessed downwards to $\Delta(T_{outside} - T_{tire\ sensor})$.

$|\Delta T|$ is assessed upwards to $MAX_i (T_{outside,i} - T_{tire\ sensor,i}) * \exp(-a*t)$, with i being counted with respect to all tires of the vehicle.

DETAILED DESCRIPTION OF THE PREFERRED EMBODIMENTS

Figure 1:
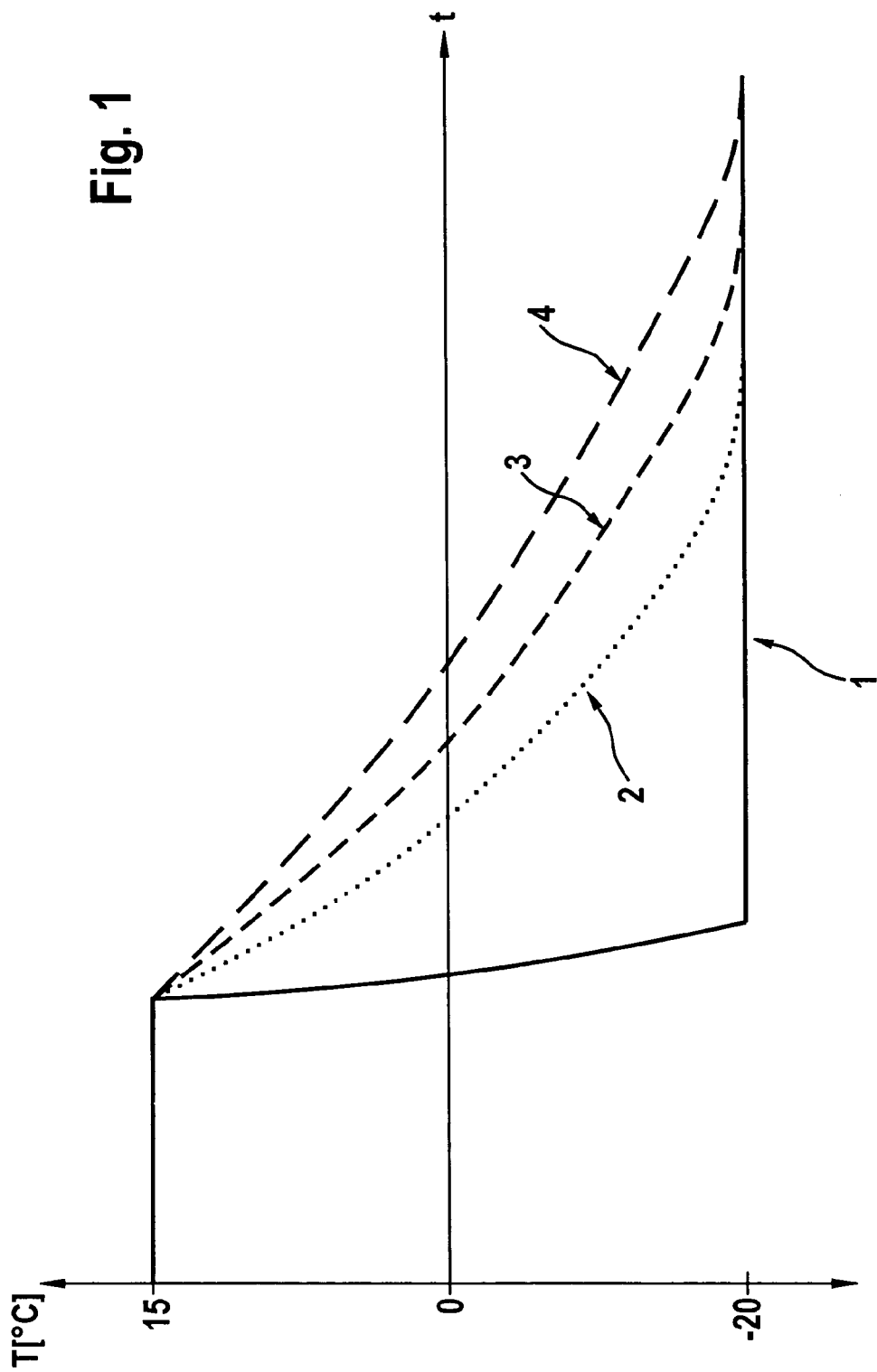
FIG. 1 is a schematic view of the time variation of the determined temperatures at an abrupt change of the outside temperature.

Curve 1 in FIG. 1 represents the variation of the outside temperature measured by means of a sensor. Curve 1 jumps from roughly +15° C. to a lower temperature of −20° C. approximately. Such a jump can occur, for example, when a motor vehicle is taken out of the garage in winter. Curve 2 depicts the variation of the wheel rim temperature (temperature signal of the pressure sensor). Curve 3 showing the signal of a temperature sensor of an electronic brake system as arranged in the engine compartment has a flattened course compared to curve 2. Said temperature sensor is preferably arranged in the control unit of an electronic brake device (e.g. ECU). The temperature of the tire represented by curve 4 changes comparatively slowly compared to curves 1 to 3. It is common to all of curves 2 to 4 that they extend corresponding to an exponential function in approximation.

The final value for the wheel rim temperature can be calculated in approximation from the course of curve 2. Under the precondition that also the exp-functional constant of the tire is known, it is then possible to assess from the final value the point of time and the end temperature of the tire at which a complete temperature compensation can be assumed.

Figure 2:
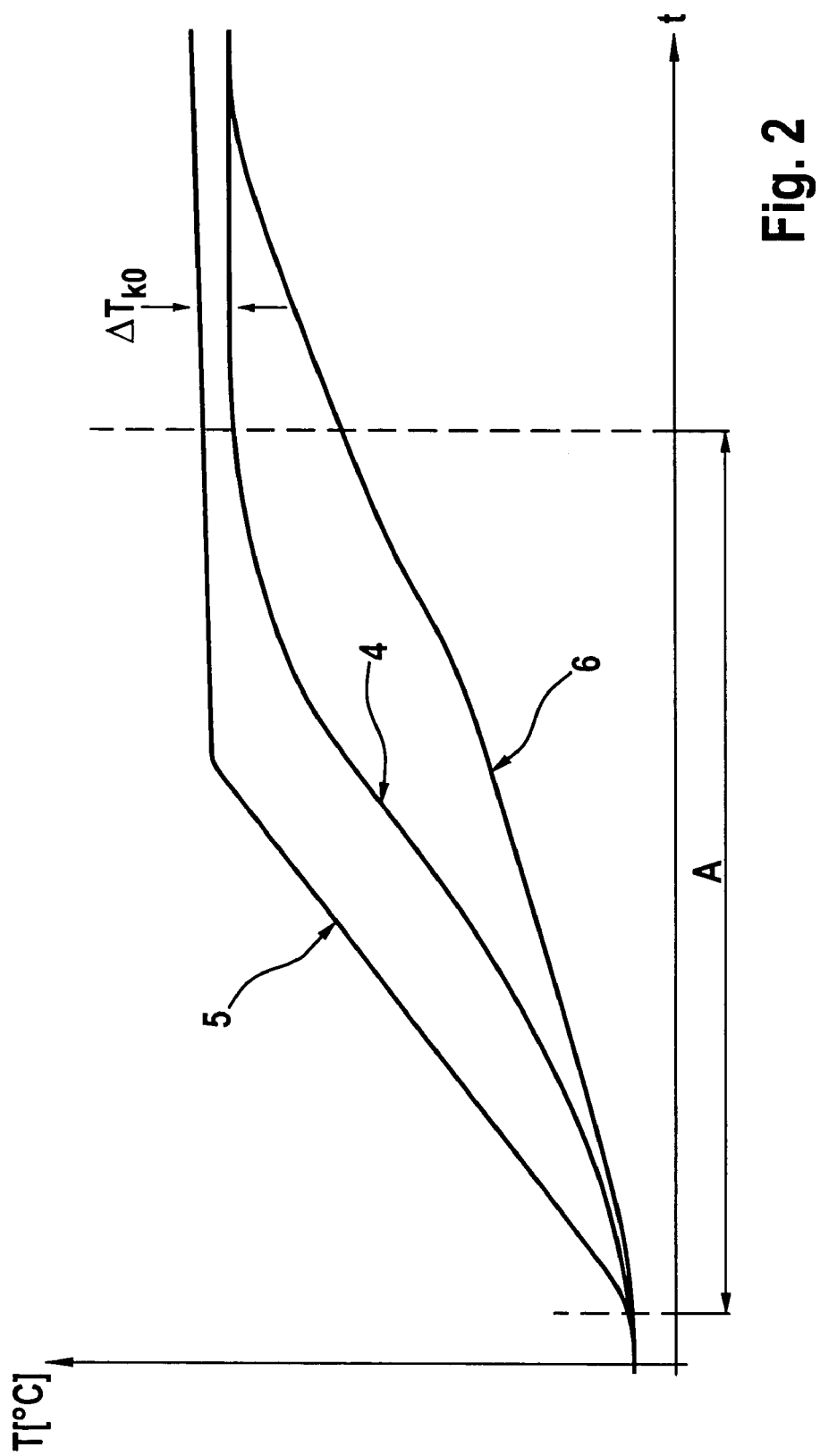
FIG. 2 is a schematic view of the time variation of the determined temperatures when the tire is heated by a heated brake disc.

In contrast to FIG. 1, FIG. 2 represents the temperature variation of sensor information when the tire temperature raises due to being heated by the brake disc, what can occur e.g. during a longer period of downhill driving or in the event of a permanent braking intervention of traction slip control.

The brake disc temperature is represented by curve 5 and initially rises continuously. Said temperature can be determined by way of a sensor or can be computed from driving-dynamics variables according to the temperature model described hereinabove. Curve 4 shows the temperature sensed by means of a tire temperature sensor. Said temperature rises more slowly than the temperature of the brake disc. Curve 6 eventually depicts the temperature of the tire air. Said temperature in turn rises more slowly than the temperature sensed by means of the tire temperature sensor 4 and, thus, at a still slower rate than the temperature of the brake disc.

It can also be seen in FIG. 2 that the correction temperature $\Delta T_k$, upon expiry of a time period A after which the brake disc temperature will no longer increase significantly, approximates a constant value $\Delta T_{k0}$. During this time period A, the calculation of the correction temperature or the compensation of the temperature, respectively, is preferably discontinued or interrupted.

The invention claimed is:

1. Method for compensating temperature in a system for tire pressure monitoring, comprising:
    determining a compensated gas temperature in the tire by way of at least two items of temperature information; and
    utilizing the determined compensated gas temperature to determine a tire pressure value for use in tire pressure monitoring.

2. Method as claimed in claim 1,
    wherein a temperature sensor at or in the wheel rim of the tire is made the basis for at least one item of temperature information.

3. Method as claimed in claim 1,
    wherein a temperature sensor in the engine compartment of the vehicle is made the basis for at least one item of temperature information.

4. Method as claimed in claim 1,
    wherein a sensor for an outside or ambient temperature of the tire is made the basis for at least one item of temperature information.

5. Method as claimed in claim 1,
    wherein a calculated temperature model is made the basis for at least one item of temperature information.

6. Method as claimed in claim 5,
    wherein the temperature model is a temperature model of the tire.

7. Method as claimed in claim 5,
    wherein the temperature model is a temperature model of a brake disc at the tire.

8. Method as claimed in claim 1,
    wherein the pressure value is determined by means of a pressure sensor arranged in the tire.

9. Method for compensating temperature in a system for tire pressure monitoring, comprising:
    determining a compensated gas temperature in the tire by way of at least two items of temperature information; and
    utilizing the determined compensated gas temperature to determine a tire pressure value for use in tire pressure monitoring,
    wherein the basis for at least one item of temperature information is selected from the group consisting of a temperature sensor at a brake disc; a temperature sensor in the engine compartment; a sensor for an outside or ambient temperature; and a calculated temperature model.

10. Method for compensating temperature in a system for tire pressure monitoring, comprising:
    determining a compensated gas temperature in the tire by way of at least two items of temperature information; and
    utilizing the determined compensated gas temperature to determine a tire pressure value for use in tire pressure monitoring,
    wherein the pressure value is determined by way of the rolling circumference or a rotational speed information of the tire.

11. Method for compensating temperature in a system for tire pressure monitoring, comprising:
    determining a compensated gas temperature in the tire by way of at least two items of temperature information; and
    utilizing the determined compensated gas temperature to determine a tire pressure value for use in tire pressure monitoring,
    wherein temperature compensation is discontinued when a rate of change of one of the items of temperature information is above a given value.

* * * * *